United States Patent
Wahli (10) Patent No.: US 9,704,147 B2
(45) Date of Patent: Jul. 11, 2017

(54) METHOD AND SYSTEM FOR AUTHORIZING ACCESS TO GOODS AND/OR SERVICES AND CORRESPONDING ACCESS VOUCHER

(71) Applicant: Microtronic AG, Oensingen (CH)

(72) Inventor: Bernard Wahli, Walchwil (CH)

(73) Assignee: MICROTRONIC AG, Oensingen (CH)

( * ) Notice: Subject to any disclaimer, the term of this patent is extended or adjusted under 35 U.S.C. 154(b) by 0 days.

(21) Appl. No.: 14/437,715

(22) PCT Filed: Oct. 23, 2012

(86) PCT No.: PCT/EP2012/070980
§ 371 (c)(1),
(2) Date: Apr. 22, 2015

(87) PCT Pub. No.: WO2014/063727
PCT Pub. Date: May 1, 2014

(65) Prior Publication Data
US 2015/0278791 A1    Oct. 1, 2015

(51) Int. Cl.
*G06Q 20/00* (2012.01)
*G06Q 20/20* (2012.01)
*G06Q 20/34* (2012.01)
*G06Q 20/38* (2012.01)

(52) U.S. Cl.
CPC .......... *G06Q 20/204* (2013.01); *G06Q 20/20* (2013.01); *G06Q 20/342* (2013.01); *G06Q 20/387* (2013.01)

(58) Field of Classification Search
CPC ................ G06Q 30/02; G06Q 30/06
USPC .......... 705/14.1, 17, 26.1; 235/381
See application file for complete search history.

(56) References Cited

U.S. PATENT DOCUMENTS

| | | | |
|---|---|---|---|
| 6,876,978 B1 | 4/2005 | Walker et al. | |
| 2004/0117250 A1 | 6/2004 | Lubow et al. | |
| 2005/0027601 A1 | 2/2005 | Walker et al. | |
| 2005/0098625 A1* | 5/2005 | Walker | G06Q 20/209 235/381 |
| 2009/0132380 A1* | 5/2009 | Tymm | G06Q 20/045 705/17 |
| 2010/0250385 A1* | 9/2010 | Lempel | G06Q 30/02 705/26.1 |

(Continued)

*Primary Examiner* — Rokib Masud
(74) *Attorney, Agent, or Firm* — Drinker Biddle & Reath LLP (57) ABSTRACT

A method for authorizing access to goods and services, including issuing an access voucher by a voucher issuing device, the access voucher having identification of the goods and services and an identification of the point of sale, presenting the access voucher to a reading device of the point of sale, transferring the identification of the goods and services and the identification of the point of sale by the reading device to a processing device of the point of sale, the processing device having access to a database with stored identification of goods and services and to a database with stored identification of the point of sale, comparing the transferred identification of goods and services and the transferred identification of the point of sale by the processing device with the stored identification of the goods and services and the stored identification of the point of sale, and authorizing access to the goods if the identification matches.

15 Claims, 4 Drawing Sheets

(56) References Cited

U.S. PATENT DOCUMENTS

2011/0047010 A1* 2/2011 Arnold .................. G06Q 30/02
                                                                                  705/14.1

* cited by examiner

METHOD AND SYSTEM FOR AUTHORIZING ACCESS TO GOODS AND/OR SERVICES AND CORRESPONDING ACCESS VOUCHER

CROSS REFERENCE TO RELATED APPLICATIONS

This application is a National Stage of International Application No. PCT/EP2012/070980 filed Oct. 23, 2012, which is herein incorporated by reference in its entirety.

TECHNICAL FIELD OF THE INVENTION

The present invention relates to a method and a system for authorising access to goods and/or services at a point of sale, in which the access to goods and/or services is authorised based on an access voucher. In addition, the present invention also relates to a corresponding access voucher.

BACKGROUND ART

Take any person in the world and you will probably find that he or she is constantly accessing different goods and/or different services. By way of example only, each time we take a cup of coffee, we access goods (i.e. a cup filled with coffee) and a service (i.e. the preparation of coffee). While some of these goods and/or services can be made available to anybody (e.g. a newspaper put at the disposal of passengers at metro or train stations free of charge or on a publicly available website), access to some other goods and/or services can be controlled in order to be able to guarantee that only authorised users can effectively access these goods and/or services.

A restricted access to goods or services can be required for various reasons. In some cases, goods or services can only be accessed by persons of a certain age. This category of goods and/or services includes e.g. pornographic or particularly violent content but also alcoholic or narcotic substances. In some other cases, it could be necessary to restrict access to goods or services based on the personal identification of the user (e.g. a user other than the owner of a boarding pass is not allowed to board an aircraft). Finally, access to goods and/or services is normally only available to those persons who have paid the corresponding purchase price.

In this last case, the access to goods or services cannot be obtained unless a predefined purchase price has been paid. Purchase points can comprise standard stores or shops where goods or services can be obtained in exchange for either real money (i.e. paper banknotes or metal coins) or some electronic payment means (e.g. a credit card or a debit card). Also, goods and/or services can also be obtained at so-called automated points of sale comprising in particular so-called vending machines or any other similar distribution devices. Vending machines of this kind can generally also accept paper or metal money, credit or debit cards, or some kind of tokens issued specially for this purpose. More sophisticated machines also allow accessing goods and/or services using any kind of electronic wallet, for example rechargeable chips, mobile phones (or other similar devices).

However, all current methods and systems for acquiring goods and/or services have some drawbacks. For example, conventional stores or shops cannot be run without employees who are in charge of the payment procedure and who control access to the goods and/or services. On the other hand, automated points of sale do not have this disadvantage since they do not require the presence of people in charge of payment procedure and access, but they nevertheless still require personnel, e.g. for emptying the repository for banknotes, coins or tokens.

Also, if automated points of sale do not offer the possibility to access goods and/or services using money, but only using cards, chips, badges or other similar electronic payment means, a wired or wireless data connection to a central unit must in general be provided in order to identify the user and/or to verify sufficient amount of credit for accessing the goods and/or services. Also, if rechargeable chips, badges or similar devices are used, recharge points for the devices must be provided for, which again requires further costly infrastructure. Finally, the production costs of such rechargeable devices are not negligible.

DISCLOSURE OF THE INVENTION

It is thus an object of this invention to propose a new and improved method, a new and improved system and a new and improved corresponding access voucher for authorising access to goods and/or services which do not present the above-mentioned inconveniences and disadvantages of the prior art. In particular, an object of this invention is to propose a new and improved method, a new and improved system and a new and improved corresponding access voucher for authorising access to goods and/or services which are intuitive, flexible, easy to implement, not expensive, and which offer a possibility of easy control.

According to the present invention, these and other objectives are achieved in particular through the features of the independent claims. In addition, further advantageous embodiments follow from the dependent claims and the description.

More particularly, this object is achieved through the present invention by a method for authorising access to goods and/or services at a point of sale, in which an access to goods and/or services is authorised based on an access voucher, the access voucher, comprising at least an identification of the goods and/or services and an identification of at least one point of sale, is issued by a voucher issuing means, and in which the access voucher is presented to a reading means of the point of sale, at least the identification of the goods and/or services and the identification of the point of sale being transferred by the reading means to a processing unit of the point of sale, wherein the processing unit comprises a database with at least one stored identification of goods and/or services and a database with a stored identification of the point of sale, and wherein the processing unit compares the transferred identification of the goods and/or services and the transferred identification of the point of sale with the at least one stored identification of goods and/or services and the stored identification of the point of sale, the access to goods and/or services being authorised if the transferred identification of the goods and/or services matches one identification of goods and/or services stored in the database and if the transferred identification of the point of sale matches the identification of the point of sale stored in the database.

The advantage of the present invention resides primarily in the fact that access to goods and/or services at a point of sale can be authorised only based on the information contained in the access voucher and the data stored in the point of sale itself. In other words, the authorisation of access does not require contacting any external unit or database. Thus, the present invention makes it possible to both authorise the access to goods and/or services at remote locations and to limit the complexity and the cost of the points of sale.

In an embodiment variant, the access voucher comprises optical machine-readable data, in particular a barcode and/or a matrix code. Any kind of known machine-readable data storage means can generally be used; however, use of two-dimensional matrix codes and in particular use of so-called QR ("Quick Response") codes presents important advantages with respect to other possible technologies. Thus, this embodiment variant of the invention has the advantage, among other things, that the reading of the access voucher by the reading means of the point of sale and the transferring of the data comprised in the access voucher to the processing unit of the point of sale can be performed using a simple and well established technology.

In another embodiment variant, the machine-readable data of the access voucher are arranged on a disposable support, in particular made of paper. The advantage of this embodiment variant is, among other things, that the access voucher can be, if required, realised as a completely disposable object and intended for one single use. If paper is used, virtually any kind of paper support can be used as the data carrier of the access voucher (e.g. a simple paper slip, such as a purchase receipt which is generally issued after a purchase transaction). Since the application of paper is more or less unlimited, this embodiment variant of the method for authorising access to goods and/or services allows for a very large range of use.

In a further embodiment variant, the access voucher further comprises a voucher identification, which voucher identification is transferred to the processing unit of the point of sale when the access voucher is presented to the reading means of the point of sale, wherein the processing unit comprises a database with at least one stored voucher identification, and wherein the processing unit compares the transferred voucher identification with stored voucher identification, the access to goods and/or services being authorised if the transferred voucher identification does not match any one of the voucher identifications stored in the database. In other words, this embodiment variant of the invention also comprises a method which allows for a control of use of the access voucher. Since the identification of the access voucher itself is also compared with the data stored at the point of sale, it can be guaranteed that an access voucher can only be used if it is not listed in the list of disabled vouchers. Therefore, the reliability of the method can be increased.

More specifically, after the access to goods and/or services has been authorised, the transferred voucher identification can be stored in the database. Thanks to this, it is in particular possible to guarantee that an access voucher is automatically disabled after it has been used and that it can be used only once. In other words, whenever goods and/or services have been accessed based on a particular access voucher, this access voucher can be systematically invalidated in order to prevent multiple access to goods and/or services.

In another embodiment variant, the access voucher further comprises a time identification, which time identification is transferred to the processing unit of the point of sale when the access voucher is presented to the reading means of the point of sale, wherein the processing unit comprises a time information means, and wherein the processing unit compares the transferred time identification with the time information provided by the time information means, the access to goods and/or services being authorised if the transferred time identification matches the time information of the time information means. This embodiment variant of the invention has the advantage, inter alia, that the temporal parameters can also be used for defining validity of access vouchers and thus for authorisation of access to goods and/or services. Specifically, the access voucher can comprise an issuing time (i.e. the time of issue of the particular access voucher itself) and/or the expiry time (i.e. the time when the access voucher becomes inoperative). In both cases, the processing unit of the point of sale can compare that time with the time at the moment of presenting of the access voucher (provided by its own time information means which can be a simple clock or another similar device) to the reading means and use this information for authorising the access to goods and/or services.

In still another embodiment variant, at least one of the identification of the goods and/or services, the identification of the point of sale, the voucher identification and the time identification of the access voucher are encrypted, wherein that the processing unit comprises a decryption means for decrypting encrypted data. The advantage of this embodiment variant, inter alia, lies in the fact that the data of the access voucher cannot be read and interpreted by unauthorised persons. In particular, the encrypting of the data can therefore be used to prevent an unauthorised generation of access vouchers (i.e. the creation of access vouchers that would be interpreted as genuine vouchers by the point of sale, but which have not been issued by an authorised issuing authority).

At this point, it should be stated that, besides the method for authorising access to goods and/or services at a point of sale according to the above-identified embodiments of the invention, the present invention also relates to a corresponding system and a corresponding access voucher for authorising access to goods and/or services at a point of sale.

BRIEF DESCRIPTION OF DRAWINGS

The present invention will be explained in more detail, by way of example, with reference to the drawings in which.

DESCRIPTION OF SPECIFIC EMBODIMENTS OF THE INVENTION

Figure 1:
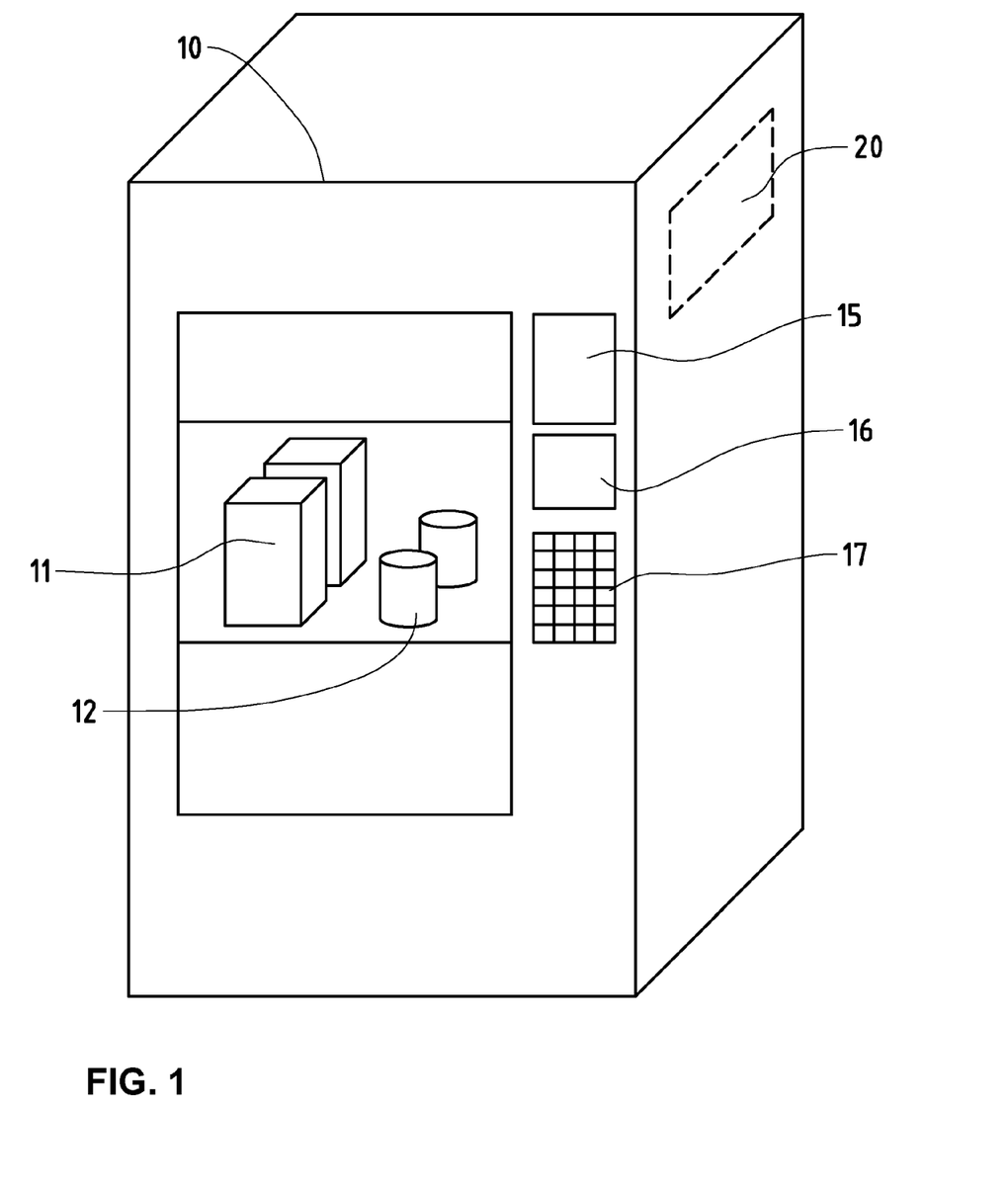
FIG. 1 is a schematic view of a point of sale which can be used in connection with the method or the system for authorising access to goods and/or services according to the present invention.

FIG. 1 illustrates in a schematic way a point of sale 10 which can be used in connection with the method or the system for authorising access to goods and/or services according to the present invention. The point of sale 10 can in particular be any known automated point of sale, such as a vending machine. Of course, the invention is not limited to this kind of point of sale, and it is possible to implement the embodiments of the invention at any other kind of point of sale, including points of sale with human personnel such as regular stores.

The point of sale 10 stores goods 11 and services 12. In FIG. 1, both goods 11 and services 12 have been represented using some very schematic forms, but a person skilled in the art will easily understand that both the goods 11 and services 12 can be of any other form or nature, and therefore the represented forms do not have to be interpreted in a limiting way. Of course, it is also possible to think of points of sale which do not directly store any goods or services but are exclusively used for authorising access to those goods and/or services (e.g. a turnstile used to control the access).

In FIG. 1, the point of sale 10 comprises a display means 15 and a data entry means (e.g. a keyboard) 17 which are used for interaction between a user and the point of sale 10. In particular, the display means 15 generally can display the purchase price of goods 11 and/or services 12 or indicate any other information to the user. The data entry means 17 can be used for selecting the goods 11 and/or services 12 but also for accessing any other information available. Of course, a person skilled in the art will easily understand that any other point of sale 10, including those without the described display means 15 and/or data entry means 17 or those with more sophisticated additional means, can be used without departing from the scope of the present invention.

When a user wishes to be authorised to access particular goods 11 and/or services 12 at the point of sale 10, he/she can generally use a classical authorisation method (e.g. he/she can use coins or a credit card to pay the purchase price), but can also use the method according to the present invention, in which an access voucher is used.

Figures 3, 4:
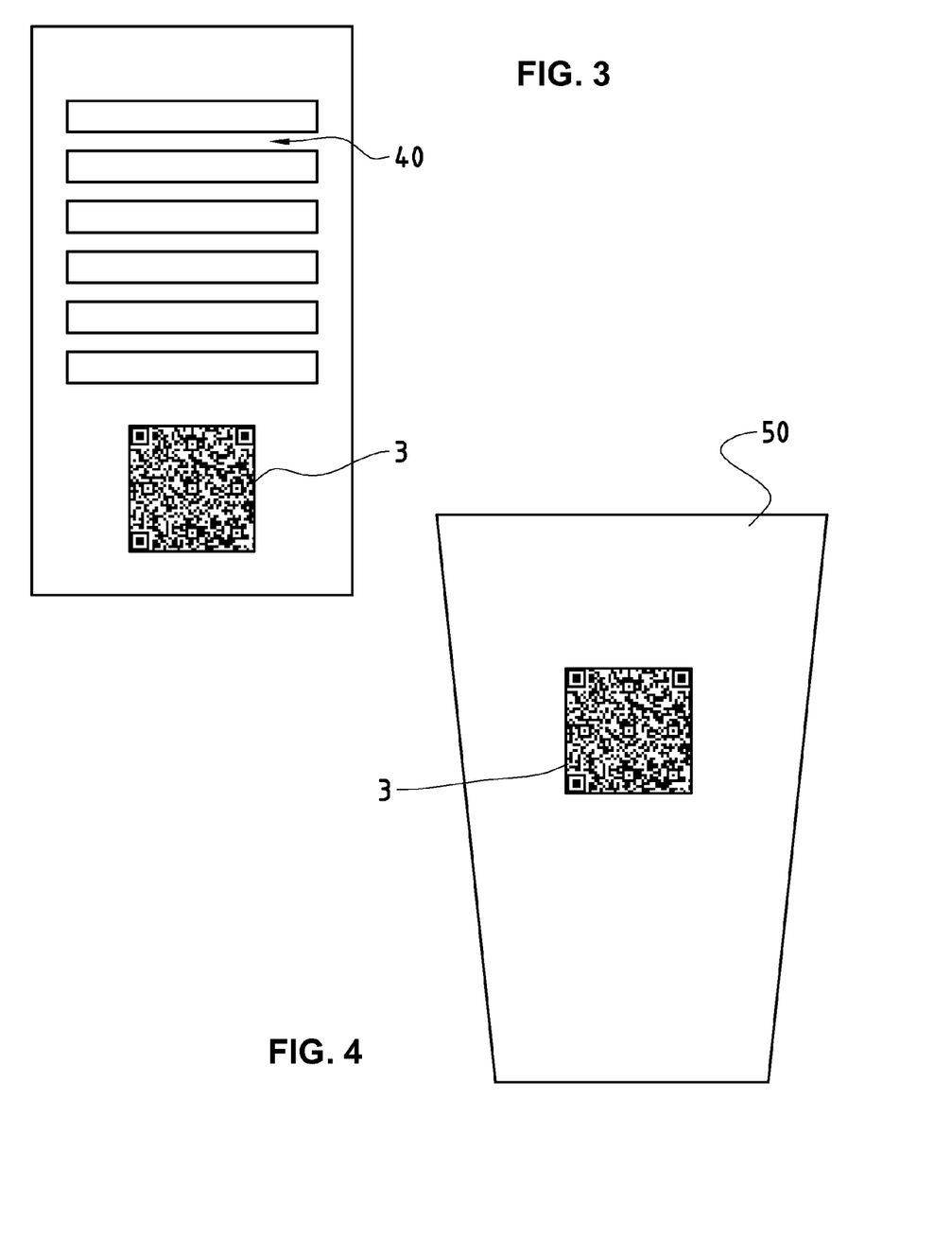
FIG. 3 is a schematic view of an access voucher according to one embodiment variant of the present invention.
FIG. 4 is a schematic view of an access voucher according to another embodiment variant of the present invention.

In particular, the point of sale 10 also comprises a reading means 16, which can be used to read the information of an access voucher 40, 50 (examples of access vouchers are represented in FIGS. 3 and 4). To this end, the access voucher 40, 50 has to be presented to the reading means 16, which then reads the data 3 stored in the access voucher and transmits this data 3 to a processing unit 20 (illustrated schematically in FIG. 1).

Therefore, access vouchers 40, 50 which are used for authorising access to goods and/or services in the sense of the present invention comprise some machine-readable data 3 which can be read by the reading means 16. The access voucher 40, 50 can in particular comprise data which can be read optically, for example one-dimensional barcodes and/or two-dimensional matrix codes. An optical code which is suitable for the present invention is a so-called QR code. QR codes consist of black modules, represented by square dots, which are arranged in a square pattern on a white background. The information encoded by a QR code can be made up of any kind of data, in particular alphanumeric data. Of course, any other kind of codes can also be used. In particular, the invention can also be implemented by any kind of non-optically readable data, such as data stored in a RFID tag or another similar device. However, the optical codes are preferred since they offer a bigger flexibility with lower costs.

Codes with data 3 can be disposed and fixed on the surface of the access voucher 40, 50 by any appropriate means. In a preferred embodiment of the invention, access vouchers are made of a disposable material, e.g. of paper, and the codes with data 3 are simply printed onto the surface of the paper by any appropriate printing means. Of course, it is also possible to print access vouchers 40, 50 to adhesive stickers (labels or tags) which are then stuck onto any appropriate support. Finally, it is also possible to use an electronic version of access vouchers 40, 50 where the code 3 is generated and transferred to any portable device (e.g. a smartphone, tablet PC, notebook or similar), for example as an image. In this case, the machine-readable data 3 can be displayed on the screen of this portable device when the access voucher 40, 50 has to be presented to the reading means 16 of the point of sale 10.

As already mentioned further above, FIGS. 3 and 4 show two different embodiments of access vouchers 40, 50 (made of paper) that can be used within the scope of the present invention, i.e. an access voucher 40 which is generally implemented as a slip of paper and an access voucher 50 which is implemented as a cup which can be used for dispensing coffee, soft drinks or any other beverage. Both the access voucher 40 and the access voucher 50 have coded data 3 on their surface. Of course, it is also possible to think of various other implementations of access vouchers 40, 50 which are suitable for use within the scope of the present invention.

Figure 2:
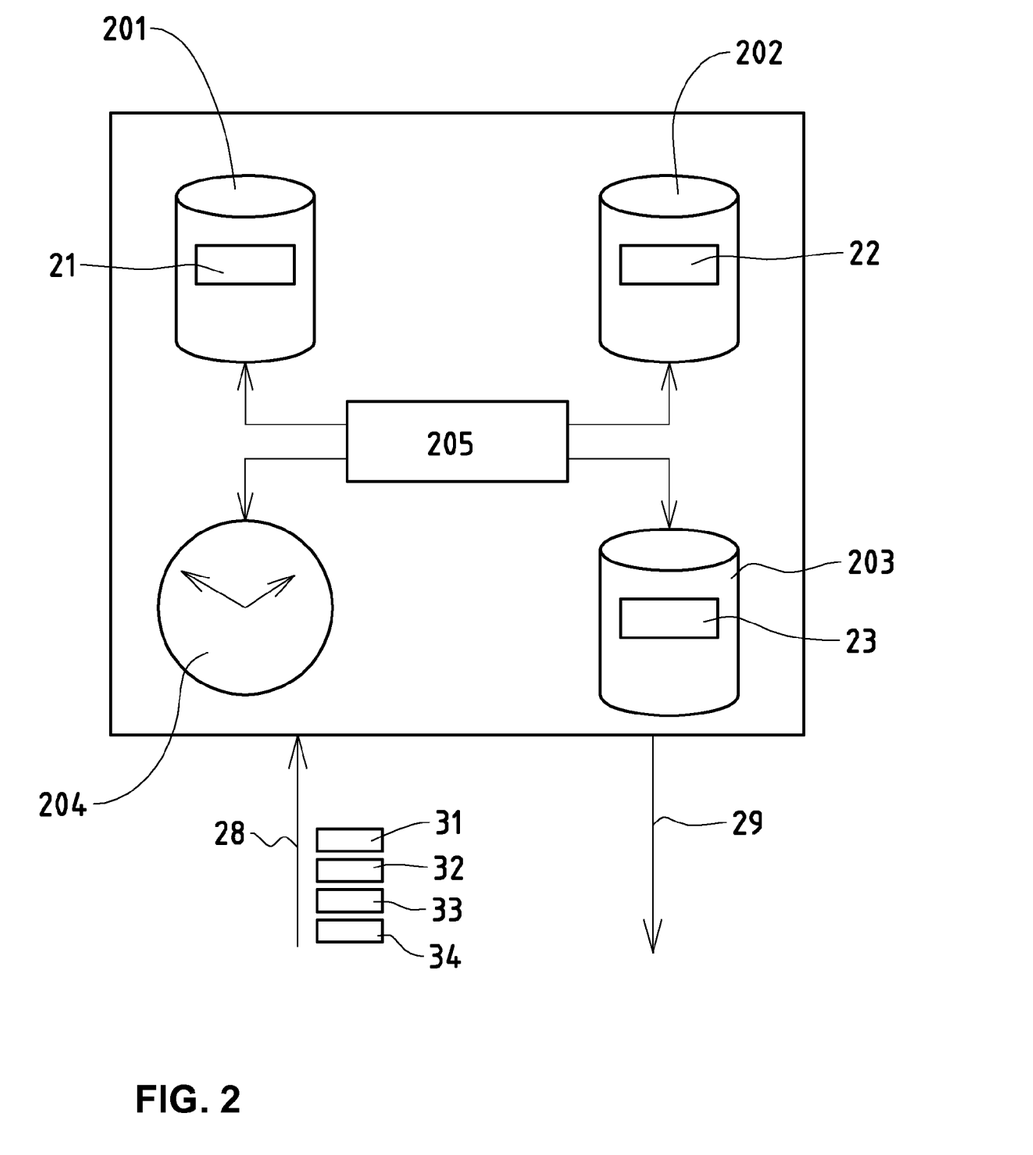
FIG. 2 is a schematic block view of the processing unit of a point of sale of FIG. 1.

FIG. 2 illustrates the processing unit 20 of the point of sale 10 in a simplified schematic way. The data 31, 32, 33, 34, which are extracted from the access voucher by the reading means 16, are transmitted to the processing unit 20 by means of an input 28.

Data 31, 32, 33, 34, which are contained in an access voucher (and which are transferred to the processing unit 20 after being read by the reading means 16 of the point of sale 10), can be of various natures and can also have various purposes. This data is prepared by a voucher issuing means 30 at the time an access voucher is issued.

Generally, an access voucher will comprise at least an identification 31 of the goods and/or services and an identification 32 of a point of sale. The identification 31 of the goods and/or services defines at least one good and/or service the access to which can be authorised by the given access voucher. Furthermore, an access voucher can also comprise an identification 33 of the access voucher itself and also a time identification 34. Of course, other data can also be included in an access voucher 40, 50.

The identifications 31, 32, 33, 34 can in particular be any alphanumerical codes which can be used to identify particular goods and/or services, point of sale, access voucher or time information. A typical identification used for identifying goods or services can be a unique numerical code which corresponds to a given good and/or service (e.g. the code 100467 can represent a particular chewing gum). However, other identification types can also be used. Similarly, the identification 32 of the point of sale and the voucher identification 33 can also be represented by any suitable alphanumerical code (e.g. the code 2067 can correspond to one particular vending machine at the train station in a particular village and the code 2012-0089909890 can be the number of the access voucher meaning that it is the voucher number 0089909890 of the year 2012). The time identification 34 can comprise a date and a time in any standardised format, e.g. 2012-11-13; 16:56:43).

As illustrated in FIG. 2, the processing unit 20 comprises various databases, namely the database 201 which stores at least one identification 21 of goods and/or services, the database 202 which stores an identification 22 of the point of sale 10, and the database 203 which stores at least one voucher identification 23.

When the access voucher is presented to and read by the reading means 16 of the point of sale 10, data that can be read and transferred to the processing unit 20 comprise any combination and number of identifications 31 of goods and/or services, identifications 32 of points of sale, identifications 33 of access vouchers and time identifications 34. In general, at least an identification 31 and an identification 32 are transferred. After receiving the data, the processing unit 20 compares the transferred identification or identifications 31 of the goods and/or services with the identification or identifications 21 of goods and/or services which are stored in the database 201 of the processing unit 20. In other words, the processing unit 20 verifies whether the identification 31 of goods and/or services stored on the access voucher matches any of the identifications 21 which are stored in the database 201. Moreover, the processing unit 20 compares the identification 32 of the point of sale retrieved from the access voucher with the identification 22 of the point of sale which is stored in the database 202 trying to match these two identifications 32 and 22. The access to goods and/or services 11, 12 of the point of sale 10 is then authorised if the transferred identification 31 of the goods and/or services matches at least one identification 21 of goods and/or services in the database 201 and if the transferred identification 32 of the point of sale matches the identification 22 of the point of sale in the database 202.

In a particular, non-limiting, example, the access voucher can contain an identification 31 corresponding to a coffee and an identification 32 corresponding to a coffee machine at a particular gas station. This machine will comprise databases 201 and 202 storing the coffee identification 21 and the identification 22 of the machine itself. If this access voucher is now presented to the coffee machine, the identifications 31 and 32 are read by the corresponding reading means 16 and transferred to the processing unit 20 of the coffee machine. The processing unit 20 will compare these data 31 and 32 with the identifications 21 and 22 in the databases 201 and 202 of the machine. Since there will obviously be a match between the data, the access to the coffee will be authorised. However, if another access voucher is used at the same coffee machine, comprising the identification 32' of another coffee machine, the processing unit 20 will not be able to match the data 32' and the stored data 22, and access to the coffee will not be granted.

Of course, it is equally possible to implement the present invention with access vouchers 40, 50 which do not comprise any identification 31 of the goods and/or services, but which comprise a code representing a predefined monetary value (i.e. 3 €, 1 $, etc.). In this case, once the access voucher 40, 50 has been presented to the reading means 16 of the point of sale 10, these data representing the monetary value are also transmitted to the processing unit 20. There, instead of comparing the identification 31 of goods and/or services from the access voucher 40, 50 with the stored data, the processing unit 20 utilises the transmitted monetary value to authorise access to goods and/or services if the transmitted monetary value is superior or equal to the purchase price of the requested goods and/or services.

As an example, if the user uses an access voucher 40, 50 with the monetary value of 3 € for purchasing a cup of coffee at an automated coffee distributor machine 10 (e.g. by pressing the corresponding button on the machine 10), the processing unit 20 of the distributor machine 10 will first verify whether the identification 32 of the machine from the access voucher 40, 50 which has been transmitted to the processing unit 20 matches the data stored in the database 202. If this is the case, the predefined purchase price of the coffee (e.g. 2.50 €) will be compared to the transmitted monetary value of the access voucher 40, 50 and, since the monetary value of the access voucher 40, 50 is superior to the purchase price, the processing unit 20 will authorise access to the coffee.

In another embodiment of the invention, the access voucher 40, 50 further comprises a voucher identification 33 which can also be read and transferred to the processing unit 20. Then, the processing unit 20 can compare the voucher identification 33 received from the access voucher 40, 50 with voucher identifications 23 which are stored in the database 203 of the processing unit 20 and authorise access to goods and/or services 11, 12 if the transferred voucher identification 33 does not match any one of the voucher identifications 23 stored in the database 203. Then, after access to goods and/or services has been authorised, the transferred voucher identification 33 can also be stored in the database 203. In other words, access to goods and/or services 11, 12 can be authorised only if the access voucher 40, 50 has not yet been used, while access will be denied if the particular access voucher 40, 50 has already been redeemed at the same point of sale. Of course, it is also possible to implement the present invention using access vouchers 40, 50 which can be used more than once. In this particular case, additional information about the number of times that the access voucher 40, 50 can be used will be stored on the access voucher 40, 50, read by the reading means 16 of the point of sale 10, and compared with the stored data in the processing unit 20. Access will only be granted if the access voucher 40, 50 has been used fewer times than the maximum number authorised.

It is further possible to use the time identification 34 of the access voucher 40, 50. This time identification 34 is generally also transferred to the processing unit 20 of the point of sale 10 when the access voucher 40, 50 is presented to the reading means 16 of the point of sale 10. At the same time, the processing unit 20 can comprise a time information means 204, for example a simple clock and calendar. The processing unit 20 can then compare the transferred time identification 34 of the access voucher 40, 50 with the time information provided by the time information means 204 and grant access to goods and/or services 11, 12 if the transferred time identification 34 matches the time information of the time information means 204.

Finally, the data 31, 32, 33, 34 on the access voucher 40, 50 can also be encrypted using any suitable encrypting means. In this case, the processing unit 20 comprises a decryption means 205 for decrypting this encrypted data 31, 32, 33, 34 before they can be compared with stored data 21, 22, 23 and data retrieved from the time information means 204.

Figure 5:
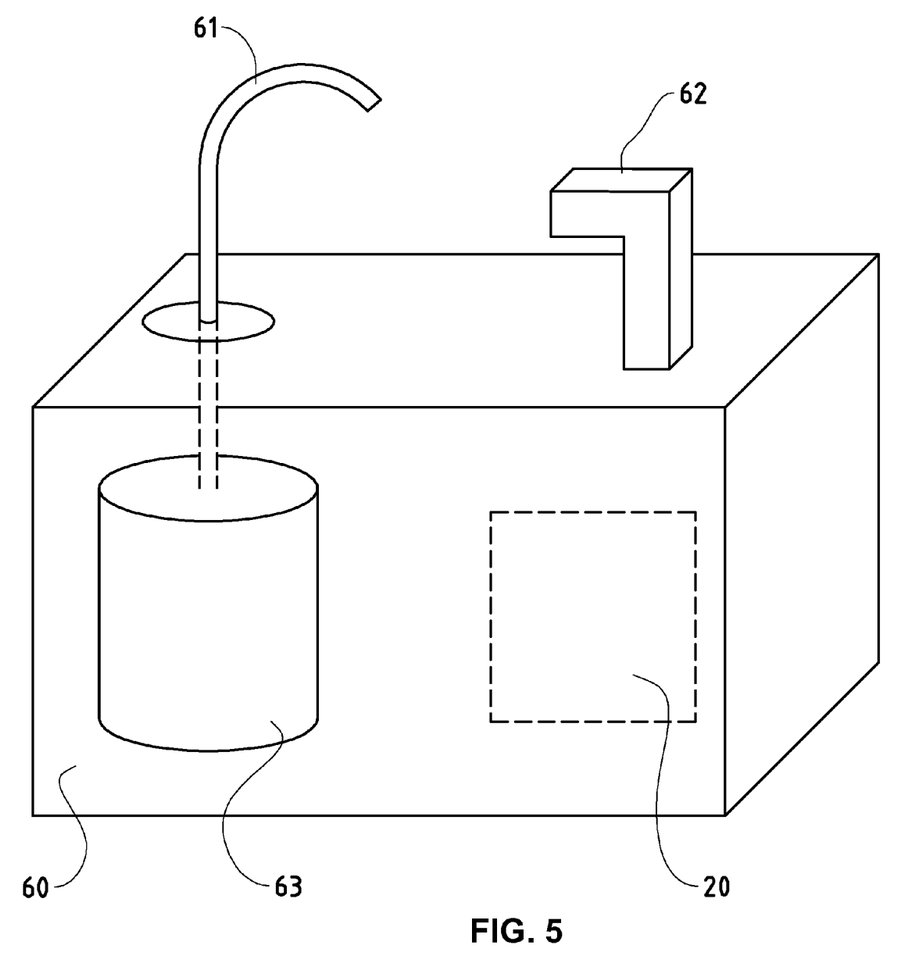
FIG. 5 is a schematic view of another point of sale which can be used in connection with the method or the system for authorising access to goods and/or services according to the present invention.

FIG. 5, finally, is a schematic view of another point of sale 60 which can be used in connection with the method or the system for authorising access to goods and/or services according to the present invention. This other point of sale 60 can for instance be a distribution point for soft drinks, like those that can be found in various fast food restaurants worldwide. The present invention can in particular be used in connection with such a point of sale 60.

The point of sale 60 in FIG. 5 in particular comprises a soft drink distribution means 61 which is connected to a soft drink repository 63. The reading means 62 is represented by a suitable scanner 62 for QR codes. The access voucher used in connection with this point of sale 60 can preferably be implemented as a drinking cup 50 of FIG. 4.

When a user arrives at the counter of the fast food restaurant, he/she can order a particular meal, including a particular drink (e.g. a mineral water). At this time, the access voucher 50 is issued by an appropriate voucher issuing means 30. For example, a suitable printer can be used for printing a simple adhesive label (tag) which can be glued to a conventional cup. However, other appropriate means for issuing the access voucher 50 can also be used. In this particular case, the access voucher 50 will comprise a QR code including, for example, the following data (of course, other data can also be present): an identification 31 corresponding to the mineral water, an identification 32 corresponding to the point of sale 60 and an identification 33 corresponding to the voucher itself.

Once the user presents the access voucher 50 to the reading means 62, the reading means will read the data 31, 32, 33 and transfer these data to the processing unit 20. The database 201 of the processing unit 20 comprises identifications of various soft drinks, including the identification 21 which corresponds to mineral water. Also, the database 202 comprises the identification 22 of the point of sale 60. After receiving the data 31, 32, 33, the processing unit 20 will encrypt the data by means of the encrypting unit 205 and then compare the transferred identification 31 corresponding to mineral water with data which are stored in the database 201, and it will match the identification 31 with the identification 21 for concluding that the access voucher 50 can be used to authorise access to mineral water. Then, the processing unit 20 will compare the identification 32 of the point of sale from the access voucher 50 with the identification 22 in the database 202, and will match these two data. Thus, the processing unit 20 will authorise access to mineral water which will be distributed by the distribution means 61 into the cup 50. Finally, the voucher identification 33 will be stored in the database 203.

If the same user tries to access mineral water again and presents his/her access voucher 50 to the reading means 62 another time, the whole process will be repeated as just described. However, the processing unit 20 will compare the transferred voucher identification 33 with the data which are stored in the database 203, and will match the identification 33 with stored identification 23. Therefore, the processing unit 20 will understand that the access voucher 50 having the voucher identification 50 has already been used, and will therefore not authorise access to mineral water.

Although the disclosure of the present invention has been described with reference to particular means, materials and embodiments, one skilled in the art can easily ascertain from the foregoing description the essential characteristics of the present disclosure, while various changes and modifications may be made to adapt the various uses and characteristics as set forth in the following claims. In particular, it will be easily understood by any person skilled in the art that the method can be adapted to allow access being granted multiple times to a particular good and/or service (and not only just once as has been described above). Furthermore, it is also conceivable to incorporate a connection of the processing unit 20 to a central unit for a regular update of databases, or to contact databases not stored at the point of sale itself, but located at another location, etc.

The invention claimed is:

1. A method for authorizing access to at least one of goods and services at a point of sale, in which access to the at least one of goods and services can be authorized based on an access voucher, the method comprising the steps of:
   presenting an access voucher including an identification of the at least one of goods and services and an identification of the point of sale to a reading device of the point of sale;
   transferring the identification of the at least one of goods and services and the identification of the point of sale by the reading device to a processing device of the point of sale, the processing device comprising a database with stored identification of the at least one goods and services and comprising a database with stored identification of the point of sale;
   comparing the transferred identification of the at least one goods and services and the transferred identification of the point of sale by the processing device with the stored identification of the at least one goods and services and the stored identification of the point of sale, the processing device configured so that the comparing step can be performed entirely based on information contained in the access voucher and the point of sale;
   authorizing access to the at least one goods and services when the transferred identification of the at least one goods and services matches an identification of the at least one goods and services stored in the database, and when the transferred identification of the point of sale matches the identification of the point of sale stored in the database; and
   preventing access to the at least one goods and services when the transferred identification of the at least one goods and services does not match the identification of the at least one goods and services stored in the database, or when the transferred identification of the point of sale does not match the identification of the point of sale stored in the database,
   wherein the database with stored identification of the at least one goods and services and the database with stored information of the point of sale are provided at the point of sale.

2. The method according to claim 1, wherein the access voucher further includes optical machine-readable data including at least one of a barcode and a matrix code.

3. The method according to claim 1, wherein the optical machine-readable data of the access voucher are arranged on a disposable support.

4. The method according to claim 1, wherein the access voucher further includes a voucher identification, and the method further comprises the steps of:
   transferring the voucher identification to the processing device of the point of sale when the access voucher is presented to the reading device of the point of sale in the step of presenting, the processing device further comprising a database with stored voucher identification;
   comparing the transferred voucher identification with stored voucher identification by the processing device; and
   authorizing access to the at least one goods and services when the transferred voucher identification does not match any one of the voucher identifications stored in the database with the stored voucher information.

5. The method according to claim 4, further comprising the step of:
   storing the transferred voucher identification in the database with the stored voucher information after the step of authorizing access has authorized the access.

6. The method according to claim 1, wherein the access voucher further comprises time identification, the method further comprising the steps of:
   transferring the time identification to the processing device of the point of sale when the access voucher is presented to the reading device of the point of sale in the step of presenting, the processing device having a time information device;
   comparing the transferred time identification with a time provided by the time information device by the processing device; and authorizing the access to the at least one goods and services when the transferred time identification matches the time information provided by the time information device.

7. The method according to claim 1, wherein data of at least one of the identification of the at least one goods and services, the identification of the point of sale, the voucher identification, and the time identification of the access voucher are encrypted, the method further comprising:
decrypting the data of the access voucher by a decryption unit of the processing device.

8. A system for authorizing access to at least one goods and services at a point of sale, in which access to the at least one goods and services can be authorized based on an access voucher, the system comprising
a reading device of the point of sale for reading an access voucher having an identification of the at least one goods and services and an identification of the point of sale; and
a processing device of the point of sale,
wherein the reading device is configured to transfer the identification of the at least one goods and services and the identification of the point of sale of the access voucher to the processing device of the point of sale when the access voucher is presented to the reading device,
wherein the processing device comprises a database with at least one stored identification of at least one goods and services and comprises a database with a stored identification of the point of sale,
wherein the processing device is configured to:
compare the transferred identification of the at least one of goods and services and the transferred identification of the point of sale with the at least one stored identification of the at least one of goods and services and the stored identification of the point of sale, the processing device configured so that the comparison can be based entirely on information contained in the access voucher and the point of sale,
authorize access to the at least one goods and services when the transferred identification of the at least one goods and services matches an identification of the at least one goods and services stored in the database, and when the transferred identification of the point of sale matches the identification of the point of sale stored in the database, and
prevent access to the at least one goods and services when the transferred identification of the at least one goods and services does not match the identification of the at least one goods and services stored in the database, or when the transferred identification of the point of sale does not match the identification of the point of sale stored in the database, and
wherein the database with at least one stored identification of at least one goods and services and the database with stored identification of the point of sale are provided at the point of sale.

9. The system according to claim 8, wherein the processing device comprises a database with at least one stored voucher identification and the processing device is further configured to compare a transferred voucher identification of the access voucher with stored voucher identification, and is configured to authorize the access to the at least one goods and services when the transferred voucher identification does not match any one of the voucher identifications stored in the database.

10. The system according to claim 9, wherein the processing device further comprises a device for storing the transferred voucher identification in the database after the access to the at least one goods and services has been authorized.

11. The system according to claim 8, wherein the processing device further comprises a time information device and is further configured to compare a transferred time identification of the access voucher with the time information provided by the time information device, and is configured to authorize the access to the at least one goods and services when the transferred time identification matches the time information of the time information device.

12. The system according to claim 8, wherein data of at least one of the identification of the at least one goods and services, the identification of the point of sale, the voucher identification, and the time identification of the access voucher are encrypted, and
the processing unit comprises a decryption unit for decrypting encrypted data of the access voucher.

13. An access voucher for authorizing access to at least one of goods and services at a point of sale, the access voucher comprising:
optical machine-readable data having at least one of a barcode and a matrix code, wherein
the optical machine-readable data comprises an identification of the at least one goods and services and an identification of the point of sale.

14. The access voucher according to claim 13, wherein the access voucher is made of a disposable material.

15. Access voucher according to claim 13, wherein the access voucher is printed onto a strip of paper or onto a drinking cup.

* * * * *